Patented Jan. 26, 1943

2,309,342

UNITED STATES PATENT OFFICE 2,309,342

METHOD OF MAKING MOLDABLE THERMO-SETTING COMPOSITIONS

Harry M. Dent, Miami, Fla., and Sydney H. Hall, Kenmore, and Lothar A. Sontag, North Tonawanda, N. Y., assignors to Durez Plastics & Chemicals, Inc., North Tonawanda, N. Y.

No Drawing. Application October 2, 1939, Serial No. 297,546

3 Claims. (Cl. 18—55)

The present invention relates to a method of making moldable thermosetting composition and more particularly a comparatively dense, solid mixture of thermosetting resin and filler capable of being molded.

Heretofore, in the preparation of molded articles wherein a thermosetting resin is used as the basis of the molded article, it has been customary to include filler, of either organic or inorganic nature, in the composition to be molded. It has also been general practice to prepare powdered mixtures of resin bond and filler as so-called molding compounds. In certain instances, dry powdered resin and dry powdered filler were mixed and the mixture sold as molding compound (Ellis, The Chemistry of Synthetic Resins, 1935, page 1278). A disadvantage of this type of compound resides in the possibility of "shaking out" with some separation of the bond and filler prior to use, thus producing non-uniformity in the composition. In other instances the mixture of filler and resin was passed through hot rollers to produce sheets which were subsequently ground. Many disadvantages attend this procedure (Ellis, page 1280).

In the production of certain kinds of molding compounds wherein it is desirable to use fillers containing relatively long fibers, the long fibers produced what are known as whiskers upon grinding rolled sheets, showing poor coverage of the filler and producing a fluffy powder from which a poor flow into preforming cavities was obtained, and in many instances poorly molded products resulted. Furthermore, due to poor coverage of filler, spots often occurred in the final article upon buffing off the fins.

It is an object of the present invention to prepare a moldable compound having a thermosetting bond and a filler wherein no separation of resin and fiber is produced and wherein a uniform relation between resin and fiber is maintained at all times with consequent production of uniformity of finished molded article.

The present invention also provides a molding composition capable of being preformed and in which good coverage of filler is obtained.

Additionally, the invention provides an excellent means for producing high density molding compositions of the thermosetting type in which long fiber filler is incorporated with the resin and in consequence of which articles of high impact strength are capable of production in molds of relatively less depth.

Furthermore, the present invention provides a high density molding composition in pellet form that can be readily placed in a preforming machine or mold and which will flow readily thereinto with the production of a desirably preformed object or article.

In accordance with the procedures of the present invention, the moldable thermosetting compound is prepared by mixing the desired filler, of any suitable nature, with a thermosetting resin containing sufficient fluid content to be flowable. The mobile thermosetting resin and filler are uniformly mixed and compounded in any desirable fashion, and to this end conventional mixing machines may be employed, such as those of the well known Werner-Pfleider type.

In general, the fluid admixed with the thermosetting resin will be water, although in special cases, other fluids volatile below about 110° C. may be employed, as for instance, toluol, alcohol, acetone and the like. A recommended procedure is to prepare the resin in an aqueous environment and mix the filler with the aqueous reaction mixture. However, when special effects are desired or where several types of thermosetting resin are included in the bond, non-aqueous solvents find application. The quantity of water or other fluid employed will be sufficient to render the mix flowable and also sufficient to absorb the frictional heat generated in a subsequent operation about to be described in detail. In general the liquid will be at least 10% of the mixture and in many instances will preferably be about 20%.

After the liquid thermosetting resin and the filler have been uniformly mixed, the resultant plastic compound is then extruded through a suitable orifice and formed into rods, the thickness or diameter of which is at least equal to the fiber length of the filler. By means of this extrusion, it is believed that flow of the plastic mass is induced with a substantial orientation of fibers parallel to the motion of flow through the extrusion orifice, thus making a substantial number of the fibers parallel to the lengthwise dimension of the rod.

The extruded rods may be formed in any desired shape and length and in general may be from ½ of an inch in length to several feet in length, although this is purely a matter controlled by subsequent use of the molding compound.

The rods, as formed in accordance with the above procedure, still contain considerable quantities of liquid, which, in many instances, would be objectionable in a molding compound since blistering would be induced with the production of a poorly molded product. This residual liquid is, therefore, removed from the molding compound by any suitable means, as, for instance, under vacuum or by drying at a relatively elevated temperature and in such fashion as to remove the enclosed moisture rapidly without producing any considerable advancement or cure of the thermosetting resin bond.

In one method of operation the rods are passed into and rapidly through a heated zone of controlled humidity suitable for inducing a rapid or substantial flash evaporation of moisture without greatly increasing the internal temperature of the mixture. When dry, the rods are hard, dense pellets that can be readily placed in a preforming mold, and due to their relatively dense nature when prepared for long fibered filler, the molds for producing a given article may be substantially shallower than those required heretofore for producing the same article from molding powder made from sheets.

As a specific illustration of the invention which is not to be deemed limitative thereof, a form of liquid resin suitable for admixture with filler in the manner above described is a one-step phenol aldehyde resin made from the following formulation:

| | Pounds |
|---|---|
| Crude phenol | 100 |
| Formaldehyde (37% aqueous solution) | 100 |
| Lime | 2 |

The above mixture is boiled until chemical reaction occurs with the production of a liquid emulsion of resin and water. This liquid resin containing very large proportions of water and entirely unsuited for molding practices as performed heretofore, is then mixed uniformly with the filler. The resultant mixture contains about 40% water, although anywhere from 8% to about 80% water may be present. Notwithstanding the large quantity of water, the mixture possesses thermosetting characteristics. The plastic mixture is then extruded through an orifice of the desired diameter and formed into flexible rods. During the extrusion process, some moisture is lost but a considerable proportion still remains in the extruded rods which moisture is subsequently removed by controlled evaporation under conditions suitable for removing moisture without inducing any considerable advancement of the resin.

Example 2

The following solution is prepared and heated to boiling in a vessel provided with an agitator and a reflux condenser:

| | Grams |
|---|---|
| USP phenol | 1000 |
| 37% formaldehyde | 1000 |
| Caustic soda | 7½ |
| 30% ammonia | 50 |

Soon after boiling begins a liquid resin separates from the solution. The mixture is boiled for ½-hour longer during which time the separated resin becomes a viscous liquid. The mixture of liquid resin and water is added to the mixer containing

| | Grams |
|---|---|
| Wood flour (ground to pass 20 mesh) | 1200 |
| Zinc stearate | 24 |

Mixing is continued for about fifteen minutes to give a bulky, fluffy, moist product in which the resin and wood flour are intimately mixed.

The bulky mixer is now put into an extrusion machine and passed through round orifices ⅛" in diameter. The extruded product is obtained in the form of small, compact rods about ⅛" in diameter. During extrusion, heat is generated and the rods come from the extruder at about 100° C. Due to their large surface area, they cool very quickly in the open air, moisture being evaporated during the process.

The rods are then dried for about fifteen minutes at 90° C. in a current of air. The product is then broken up to pass a four mesh screen and is ready for molding. The apparent density of the material is 0.285 gm. per cc.

The fluffy powder taken from the mixer if dried directly in exactly the same way, is moldable but has an apparent density of only 0.190.

Example 3

A resin is prepared according to Dent (U. S. Patent No. 1,894,088) from the following reactants:

| | Grams |
|---|---|
| Duty-free cresylic acid | 1000 |
| 37% formaldehyde | 850 |
| Slaked lime | 5 |

The mixture is heated to boiling and a resinous phase separates almost as soon as boiling temperature is reached. The following solution is carefully added:

| | Grams |
|---|---|
| Ammonium sulfate | 9 |
| Hexamethylene tetramine | 80 |
| Water | 200 |

Refluxing is continued (about 25 minutes) until the separated resinous phase gives a 7 inch string from a cold plate.

The product which is a mixture of a liquid resin phase and an aqueous phase is added to

| | Grams |
|---|---|
| Wood flour (ground to pass 60 mesh) linoleum grade | 1200 |
| Zinc stearate | 24 | and thoroughly mixed. The mixture is extruded, dried and ground as in Example 2. The resulting product has an apparent density of 0.29. The mixture dried without extrusion has an apparent density of 0.21.

Thermosetting resins other than the phenol aldehyde type are suitable for use in the manufacture of molding compositions of the present invention and to this end urea aldehyde resins, as well as other types of thermosetting natural and synthetic resins, may be employed.

Example 4

A resin is prepared by heating for 1 hour at boiling temperature a mixture of

| | Grams |
|---|---|
| Urea | 600 |
| 37% formaldehyde | 1400 |
| Triethanolamine | 12 |

The product is mixed as before with

| | Grams |
|---|---|
| Fine wood flour (ground to pass 60 mesh) | 900 |
| Stearic acid | 10 |

After extrusion and drying and grinding as in Example 2, the molding powder has an apparent density of 0.25. Dried without extrusion the molding powder has an apparent density of 0.20.

The present invention is of especial applicability in the production of a thermosetting molding composition containing long fiber filler, i. e. fillers such as chopped cord, cotton floc, threads, and long rolled asbestos fiber. Molding compositions of thermosetting resin and a filler of this type are fluffy and have a low apparent density due to the nature of the filler and due to the fact that rolled sheets when pulverized "whisker" so that much of the fiber is free and uncovered.

To produce high density pellets or rods of long fiber filler, the filler of this type is mixed with the liquid resin and extruded as described. To get good orientation of the fibers, the length of travel through the extrusion mold should be moderately great and at least about ⅛"; the greater the length of travel, the better the orientation.

The rods after extrusion and while still at an elevated temperature are placed in a tumbler and tumbled about. During this process, the rods are broken up and any free fiber extending outwardly from the surface of the rods is pressed into and held within the rods, furthermore, any voids due to removal of liquid are eliminated and the density increased. After tumbling, the rods are dried, as indicated, hereinbefore. The apparent density of the dried, tumbled rods with chopped cord as filler possessed a density of 0.29 gm./cc. as against 0.15 gm./cc. when made into sheets and ground.

From the foregoing it will be seen that the invention provides a method for making a high density molding composition from long fibered filler, a composition wherein excellent coverage of the filler is obtained and wherein reproducible plasticity of the compound may be obtained.

What is claimed is:

1. The method of making a thermosetting molding compound which comprises mixing a liquid thermosetting resin and filler to form a plastic mix containing at least about 10% moisture, forming the mix into pellets, removing water from the pellets and tumbling the pellets until their density has increased considerably without destroying the thermosetting characteristics thereof.

2. The method of making a thermosetting molding compound which comprises mixing an aqueous dispersion of a thermosetting resin and filler to form a plastic mix, forming the mix into rods and thereafter tumbling the rods until a considerable increase in density has occurred, the rods still retaining their thermosetting properties.

3. The method of making a thermosetting molding compound which comprises forming an aqueous dispersion of a thermosetting resin and filler into pellets containing considerable water and thereafter drying and tumbling the pellets until a considerable increase in density has occurred without destroying their thermosetting characteristics.

HARRY M. DENT.
SYDNEY H. HALL.
LOTHAR A. SONTAG.